though the same type novolac resins. One can not, however, substitute for the methyl abietate, other abietates, such as butyl abietate, ethyl abietate, glycerol abietate, rosin, etc.

United States Patent Office
3,106,540
Patented Oct. 8, 1963

3,106,540
WATER BEARING NOVOLAC RESIN BINDERS FOR FOUNDRY SANDS
Bernard Freedman, Springfield, Mass., assignor to Monsanto Chemical Company, St. Louis, Mo., a corporation of Delaware
No Drawing. Filed July 27, 1959, Ser. No. 829,507
12 Claims. (Cl. 260—25)

The present invention relates to metal founding and more particularly to resin-coated sands useful in producing shell molds and cores.

Shell molds and cores are now generally produced from foundry sands coated with (a) a thermosetting resin binder and (b) a cross-linking agent for said resin. The coated foundry sand is deposited on a heated metal pattern for a period of time sufficient only to form the coated sand into a facsimile mold or core, defining the pattern. The facsimile mold or core is then subjected to elevated temperatures in order to cure the resin binder to a thermoset condition. The result is a shell mold or core useful for casting metals, alloys, etc.

Among the resins presently used to coat these foundry sands are "novolac" resins. These are two-stage resins synthesized with an excess of phenol to formaldehyde, more specifically in mol ratio of 0.5 to 0.8 mol of formaldehyde for each mol of phenol. These resins are thermoplastic and brittle in nature when dehydrated. The amounts of novolac resin to sand used for making shell molds, generally ranges from 4.5 to 6.0 parts by weight on a resin solids basis, per 100 parts of sand.

In order to facilitate uniform coating of the novolac resin onto the sand and incidently contribute tensile strength to the shell molds which result, it has become the practice to use an alcohol solution of the resin. Generally, 30 to 40% by weight of alcohol based on phenol. The alcohol solvated resin, cross-linking agent, and the sand are then intensively blended together in a muller or the like while simultaneously being subjected to heat ranging from 150° F. to 250° F. The time expended for the same is that sufficient to cause the alcohol and other volatiles to be removed and to advance the resin to the point at which the now resin coated-sands, can be described as exhibiting a desired "stick-point." The latter is that stage of advancement at which a resin-sand layer (1/16" thick) will adhere to a metal bar heated conductively through a temperature gradient, e.g., 160°–250° F. The lowest temperature on the bar at which the mix adheres is designated the stick-point for the particular resin. The desired stick-points for resin-coated sands useful in shell molding are 190–225° F. for those used in cores, and 175–210° F. for those used in the molds. Using the hot mulling temperatures above, a heating period of 5–15 minutes is usually sufficient to contribute advance of this magnitude to the resins.

When the resin has been advanced to the desired stick-point the coated sands are removed from the muller or blender and cooled to room temperature. Incidental with cooling, the coated sands are subjected to a screening operation carried on for the purpose of insuring that the coated sands are free flowing or pulverulent in nature. This operation subjects the coated sands to severe abrasion.

While the preceding method for preparing resin coated foundry sands, using alcohol solvated novolac resins, has been a distinctive advance in the field of shell molding, nevertheless certain problems relative to novolac resins of this type remain to be solved. In particular, coated sands resulting from this method exhibit low resistance to abrasion of the type which occurs during the screening or other operations in which the sands are abraded such as air conveying etc. carried on after coating, with the result that a considerable amount of the resin binder is removed from the sand particles, leading ultimately to lessened tensile strength in the resulting shell molds.

Accordingly, it is a principal object of the present invention to provide novolac resin products which can be coated on foundry sands designed for use in producing shell molds and cores.

Another object is to provide novolac resin products which after being coated on foundry sands, exhibit improved abrasion resistance when subjected to screening or other abrading operations.

Another object is to provide a method by which to produce the above improved novolac resin products.

Another object is to provide free-flowing particulate resin-coated foundry sands, the individual sand particles of which are coated with a partially advanced, thermosetting resin.

Other objects of the invention will in part be obvious and will in part appear hereinafter.

These and other objects of the invention are attained in a one-phase liquid resin product adapted for use in coating foundry sands useful in shell molds and cores comprising in combination (a) and acid catalyzed novolac resin, (b) alcohol, and (c) a particularized amount of methyl abietate.

The following examples are provided in illustration of the invention. Where parts are mentioned, parts by weight are intended.

EXAMPLE I

Charge 100 parts of liquid phenol (1.06 mols) and 0.3 part sulfuric acid (conc.) into a reactor provided with a condenser, reflux return line and an agitator, and raise the temperature to about 95° C. Meter in 64 parts of formalin (37% formaldehyde) (.79 mol). Following this addition, reflux the reaction mixture for 20 minutes at 100° C. Dehydrate the reaction product essentially to completion by allowing the water to distill off. After allowing the dehydrated product to cool to about 80° C., add slowly 30 parts of ethyl alcohol under mild reflux conditions, 80–90° C., and maintain for 15 minutes together with agitation. The product is now an alcohol solution of novolac resin having a viscosity of about 4000 centipoises (Brookfield) at 25° C.

EXAMPLE II

Charge 100 parts of phenol (1.06 mols) and 0.3 part sulfuric acid (conc.) into the reactor and raise the temperature to about 95° C. Meter in 64 parts of formalin and reflux the reaction mixture for a period of about 20 minutes at 100° C. The resulting reaction product is then dehydrated by allowing the water to be distilled off. After cooling the dehydrated reaction product to about 80° C., add gradually 30 parts of ethyl alcohol, followed by 1.5 parts of methyl abietate and maintain the same under 80–90° C. with agitation for about 15 minutes. The resin product is an alcohol solution of novolac resin having a viscosity of about 4000 centipoises (Brookfield).

In order to test the resin products for abrasion resistance of the type previously described, the following test procedure can be followed. Ten thousand grams of washed, round grain foundry sand, together with 16% hexamethylene tetramine and 3.0% of calcium stearate, the last two based on the solid content of the resin product to be tested, are blended for 15 seconds at room temperature in a laboratory muller. Add 3% resin product solids as determined on the weight of the sand and continue mulling at 275° F. (forced air temperature) until the resin coated sands exhibit a stick-point ranging 190–225° F., actually about 205° F. This requires approximately 6 minutes. Screen (20 mesh) through and cool by aerating to room temperature. The coated sand is then placed in a cylindrical cannister (8 inches in diameter by 6 inches effective height) and stationed under a laboratory mixer provided with a pair of planetary rotational members. The inner member constitutes an effective 4 x 4 inch open blade. The other or peripheral member effectively circumscribes 3 sides of the profile of the inner member, i.e., top, bottom and one side. The riser section of the peripheral member is projected outwardly to form a blade having close tolerance (1/16 inch) with the inner periphery of the cannister.

The resin coated sands to be tested are abraded by rotating the members at 160 r.p.m. for a period of 15 minutes. Simultaneous with abrading, the sands are subjected to a vacuum sufficient only to extract the resin abraded off the sand.

In order to determine hot tensile strength, portions of the resin coated sands are advanced to a stick-point of 205° F. and formed into standard AFS tensile-test briquettes c.s.a. 0.25 x 1.0 inch. In doing so, a split mold is filled with the coated sand and struck off at 400° F. The facsimile briquettes are cured at 400° F. for 90 seconds and while maintained at this temperature are subjected to tension in a tensile tester. The outcome of this test reflects speed of cure of the resin.

When samples of the foregoing examples are tested in accordance with the procedures set forth above, the following results are obtained:

*Table I*

| Example | I | II |
|---|---|---|
| Hot Tensile Before Abrasion (p.s.i.) | 180 | 185 |
| Hot Tensile After Abrasion (p.s.i.) | 100 | 145 |
| Difference-Loss (p.s.i.) | 80 | 40 |

It can be noted from the tensile data above that the resin product of Example II containing methyl abietate has increased abrasion resistance when compared to the similar resin which does not contain this material.

In the examples which follow, the resin products are designed to have an improved property of nonflammability resulting from the presence of additional internally bound water. In the case of those resin products containing 2–5% ethylene glycol on the weight of phenol, the amount of water bound into the resin product is 9–13%, while in the case of those containing lime in addition to the glycol, the amount of bound water is increased to 22–30%. In each instance, percentage of water is in relation to the weight of the final resin product. Flammability is of course of particular concern when hot mulling is used, accompanied by vaporization of the alcohol solvent. The presence of water in the amounts indicated above contributes a decided advance in this regard.

EXAMPLE III

Charge 100 parts of phenol (1.06 mols) and 0.3 part of sulfuric acid (conc.) into the reactor and raise the temperature to about 95° C. Meter in 64 parts of formalin (37% formaldehyde) (.79 mol). Following the completion of this addition, reflux the reaction mixture at atmospheric pressure (100° C.), for a period of about 20 minutes. Distill off 45 parts of water. Cool the resin which remains to 80° C. and while maintaining this temperature slowly blend into the resin 14 parts of ethyl alcohol, stir for 15 minutes and add 2 parts of ethylene glycol. The resin product which results is a one-phase liquid, water-bearing novolac having a viscosity of approximately 15,000 centipoises (Brookfield). The water bound in the resin product is determined as being about 11 weight percent based on the total resin product.

EXAMPLE IV

Charge 100 parts of phenol (1.06 mols) and 0.3 part of sulfuric acid (conc.) into the reactor and heat to about 95° C. Gradually add 64 parts of formalin (37% formaldehyde) (.79 mol) and following this, reflux the reaction mixture under atmospheric condition for about 20 minutes. Distill off 45 parts of the water. Cool the resin which now remains to 80° C. and while maintaining this temperature, gradually blend in 14 parts of ethyl alcohol and then 2 parts of ethylene glycol, followed by 1.5 parts of methyl abietate. The resin product which results is a one-phase liquid, water-bearing novolac having a viscosity of approximately 15,000 centipoises (Brookfield). The water bound in the product is determined as being about 11 weight percent based on the total resin product.

EXAMPLE V–XII

The procedure set forth in the preceding example is again followed with the exception that after resinification (a) 28 parts of water are removed and (b) lime, slurried in twice its weight of water is added gradually. The following table sets forth the constituents and amounts thereof used.

*Table II*

| Example | V | VI | VII | VIII | IX | X | XI | XII |
|---|---|---|---|---|---|---|---|---|
| Phenolic | 100 | 100 | 100 | 100 | 100 | 100 | 100 | 100 |
| Formalin | 64 | 64 | 64 | 64 | 64 | 64 | 64 | 64 |
| Catalyst | H₂SO₄ .3 | H₂SO₄ .3 | H₂SO₄ .3 | H₂SO₄ .3 | H₂SO₄ .3 | H₂SO₄ .3 | H₂SO₄ .3 | Oxalic 2.0 |
| Lime in Water | 6 / 12 | 5 / 10 | 5 / 10 | 5 / 10 | 5 / 10 | 5 / 10 | 5 / 10 | 6 / 12 |
| Ethanol | 14 | 14 | 14 | 14 | 14 | 14 | 14 | 14 |
| Ethylene Glycol | 2 | 2 | 2 | 2 | 2 | 2 | 2 | 2 |
| Methyl Abietate | .5 | 1.0 | 1.5 | 2.0 | 3.0 | 5.0 | 6.0 | 1.5 |

The resin products of Examples III–XII are tested in accordance with the procedure set forth above. The tensile data exhibited by each is as follows:

*Table III*

| Example | III | IV | V | VI | VII | VIII | IX | X | XI | XII |
|---|---|---|---|---|---|---|---|---|---|---|
| Hot Tensile Before Abrasion (p.s.i.) | 190 | 190 | 230 | 230 | 230 | 220 | 220 | 200 | 200 | 220 |
| Hot Tensile After Abrasion (p.s.i.) | 120 | 160 | 150 | 180 | 180 | 170 | 170 | 140 | 140 | 170 |
| Difference-Loss (p.s.i.) | 70 | 30 | 80 | 50 | 50 | 50 | 50 | 60 | 60 | 50 |
| Methyl Abietate in Resin | 0 | 1.5 | 0.5 | 1.0 | 1.5 | 2.0 | 3.0 | 5.0 | 6.0 | 1.5 |

Consideration of the data leads to the conclusion again that those coated sands containing methyl abietate in the resin components have increased abrasion resistance over those which do not, provided, however, that the amount of methyl abietate is maintained at about 1.0–6.0 and more preferably 1.0–4.0 parts on 100 parts by weight of phenol.

The present invention is directed to one-phase liquid resin products adapted for coating foundry sands which can be eventually used in shell molds and cores. The featured resin products comprise (a) an acid catalyzed novolac resin, (b) alcohol and (c) a defined amount of methyl abietate.

The novolac resins which can be used in practice of the present invention are those constituting in the ratio 0.5–0.8 mol. of formaldehyde for each mol. of phenol and more particularly 0.6–0.75 mol. of formaldehyde per mol. of phenol. The formaldehyde can be in the various known forms including formalin (37% aqueous sol.) paraform, etc. The phenol can be phenol, meta cresol and mixtures thereof, as well as mixtures including ortho, para and meta alkyl substituted phenols. These resins are acid catalyzed. Acid catalysts which can be used include sulfuric acid, hydrochloric, oxalic, boric, phenolsulfonic acid, etc.

The process utilized in making the novolac resins can be that usually practiced, in which phenol and acid are added to a suitable reaction vessel and heated to about 95° C. This is followed by gradual addition of the formaldehyde to the molten phenol. The reaction mixture is raised to reflux temperature and maintained for a period of about 20–120 minutes depending upon the acid catalyst chosen. The reaction product is a two-phase liquid resin system, the top layer being essentially water and the bottom layer resin containing a small amount of water, i.e., about 5 weight percent on the weight of the solid resin.

In the simplest embodiment of the present inventon, the water contained in both layers of the resin product can be removed by any convenient method to provide a thermoplastic lump novolac resin. This is then solvated in 30–40 percent of alcohol as determined on the weight of phenol, and the methyl abietate is then blended in.

The present invention can also be practiced by departing from the procedure set forth above, by removing only a portion of the top layer (water) of the reaction product. The water then remaining in the top layer plus the residual water contained in the lower layer (resin) is intimately bound up with the novolac to provide a resin product exhibiting lessened flammability. This can be achieved by blending the partially dehydrated reaction product with a glycol and an alcohol. Blending can be carried out at temperatures ranging 75–95° C. and more preferably 80 to 90° C. The amount of water to be bound can range 9–13% by weight of the resin product.

In still another embodiment, water ranging from 22–30% of the final resin product can be bound into the resin product giving it added nonflammability by blending in lime in addition to the glycol and alcohol mentioned above, the amount of lime being between 5–10 parts by weight as determined on 100 parts by weight of the phenol charge. As indicated in the exemplary materials, these resins have improved hot tensile strength reflective of faster curing times and also faster processing times. Preferably, the lime is introduced as an aqueous slurry after the resinification step and prior to the addition of the glycol and alcohol. When this embodiment is practiced, a lesser amount of water need be removed following the resinification step. In either of the latter two embodiments (additional water-bearing resins), it is of course possible to remove all or part of the water from the novolac which results from the resinification and replace with the amount of water desired to be bound into the resin product the limit as to the amount of water being prescribed above.

As indicated in the exemplary materials the amount of methyl abietate to be used in practice of the present invention ranges 1–6 weight percent as determined on phenol and more particularly 1–4 weight percent as so determined.

The amount of glycol to be included in the resin products using the same, ranges 2–5 weight percent on phenol while the alcohol can range 11–14 weight percent on phenol when used conjunctively with glycol. When the glycol is not included, the amount of alcohol varies 30–40 percent by weight of phenol. The glycols which can be used include ethylene glycol, propylene glycol and the like, while the alcohol can be methanol, ethanol, propanol, etc. Those preferred are ethylene glycol and ethyl alcohol.

The resin products of the present invention can be used in coating foundry sands together with cross-linking agents as exemplified by hexamethylene tetramine. The amount of cross-linking agent is generally 14–16 parts per weight as determined on resin solids. The amount of resin product to be used in providing coated sands can be 2–6 weight percent resin solids per 100 parts of sand. Greater amounts of the resin product can be used to lend further tensile strength, etc. to the resulting shell molds and cores, but for the usual practice, the above stated amounts are sufficient.

In addition to the resin product and cross-linking agents, lubricants can also be included in the resin product sand mix. These include the various metal soaps such as aluminum stearate, calcium stearate, magnesium stearate, zinc stearate, etc. The amounts of lubricant which can be used are 3–6 weight percent as determined on the weight of the resin solids.

The sands which can be coated are those usually used in foundry practices, such as round grain sands and sub-angular sands which have been washed free of clay and dried. Mixing of the resin products with the sand can be in a muller, blender, or other mixer with forced hot air temperatures of 150–250° F. when the resin products are of the simple alcohol solution type. However, when the resin products are the additional water-bearing type, or water-bound type which can be obtained by including glycol or glycol and lime resins accompanied with water, then mulling temperatures up to 600° F. can be utilized. Mulling periods of 5–15 minutes are generally sufficient at these temperatures to arrive at the stickpoints previously described.

The resin-coated sands which results from using the resin products of the present invention are free-flowing, non-caking and dust-free in nature. When formed into shell molds and cores, they exhibit improved tensile strength as compared to molds and cores formed from sands coated with conventional novolac resins. These shell molds and cores which result can be used in casting ferrous, nonferrous metals and alloys of the same.

It will thus be seen that the objects set forth above, among those made apparent from the preceding description, are efficiently attained and, since certain changes can be made in the products and in carrying out the process of the present invention without departing from the scope of the invention, it is intended that all matter contained in the above description shall be interpreted as illustrative, and not in a limiting sense.

What is claimed is:

1. A resin-coated sand comprising particles of foundry sand coated with a mixture of (1) an acid-catalyzed novolac reaction product of 0.5–0.8 mol of formaldehyde per mol of phenol, (2) 1–6% of methyl abietate, based on the weight of phenol, and (3) a cross-linking agent for the novolac resin.

2. A resin-coated sand as in claim 1 wherein the coating contains 1–4% of methyl abietate, based on the weight of phenol.

3. A process which comprises coating foundry sand with (1) a one-phase liquid composition comprising (a) an acid-catalyzed novolac reaction product of 0.5–0.8 mol of formaldehyde per mol of phenol, (b) 1–6% of methyl abietate, based on the weight of phenol, and (c) 30–40% of a monohydric alcohol, based on the weight of phenol, and (2) a cross-linking agent for the novolac resin.

4. A process as in claim 3 wherein the one-phase liquid composition contains 1–4% of methyl abietate, based on the weight of phenol, and wherein the alcohol is ethyl alcohol.

5. A process which comprises coating foundry sand with (1) a one-phase liquid composition comprising (a) an acid-catalyzed novolac reaction product of 0.5–0.8 mol of formaldehyde per mol of phenol, (b) 1–6% of methyl abietate, (c) 11–14% of a monohydric alcohol, (d) 2–5% of a glycol, and (e) water; the percentages of ingredients (b), (c), and (d) being based on the weight of phenol; said water constituting up to about 13% of the total weight of the liquid composition, and (2) a cross-linking agent for the novolac resin.

6. A process as in claim 5 wherein the one-phase liquid composition contains 9–13% of water, based on the weight of the composition, and 1–4% of methyl abietate, based on the weight of phenol, and wherein the alcohol is ethyl alcohol and the glycol is ethylene glycol.

7. A process which comprises coating foundry sand with (1) a one-phase liquid composition comprising (a) an acid-catalyzed novolac reaction product of 0.5–0.8 mol of formaldehyde per mol of phenol, (b) 1–6% of methyl abietate, (c) 11–14% of a monohydric alcohol, (d) 2–5% of a glycol, (e) 5–10% of lime, and (f) water; the percentages of ingredients (b), (c), (d), and (e) being based on the weight of phenol; said water constituting up to about 30% of the total weight of the liquid composition, and (2) a cross-linking agent for the novolac resin.

8. A process as in claim 7 wherein the one-phase liquid composition contains 22–30% of water, based on the weight of the composition, and 1–4% of methyl abietate, based on the weight of phenol, and wherein the alcohol is ethyl alcohol and the glycol is ethylene glycol.

9. A one-phase liquid composition comprising (a) an acid-catalyzed novolac reaction product of 0.5–0.8 mol of formaldehyde per mol of phenol, (b) 1–6% of methyl abietate, (c) 11–14% of a monohydric alcohol, (d) 2–5% of a glycol, (e) 5–10% of lime, and (f) water; the percentages of ingredients (b), (c), (d), and (e) being based on the weight of phenol; said water constituting up to about 30% of the total weight of the composition.

10. A composition as in claim 9 cotaining 22–30% of water, based on the weight of the composition, and 1–4% of methyl abietate, based on the weight of phenol; the alcohol of the composition being ethyl alcohol and the glycol being ethylene glycol.

11. A process for preparing a one-phase liquid product containing up to about 30% by weight of water which comprises blending (a) a water-containing, acid-catalyzed novolac reaction product of 0.5–0.8 mol of formaldehyde per mol of phenol with (b) 1–6% of methyl abietate, (c) 11–14% of a monohydric alcohol, (d) 2–5% of a glycol, and (e) 5–10% of lime; the percentages of ingredients (b), (c), (d), and (e) being based on the weight of phenol.

12. A process for preparing a one-phase liquid composition which comprises consecutively blending (a) 14% of ethyl alcohol, (b) 2% of ethylene glycol, and (c) 1–4% of methyl abietate, each based on the weight of phenol, into a water-containing, acid-catalyzed novolac reaction product of 0.5–0.8 mol of formaldehyde per mol of phenol and maintained at a temperature of 75–90° C.

References Cited in the file of this patent

UNITED STATES PATENTS

| | | |
|---|---|---|
| 2,357,091 | D'Alelio | Aug. 29, 1944 |
| 2,483,468 | Jones | Oct. 4, 1949 |
| 2,510,837 | Schrimpe | June 6, 1950 |
| 2,675,335 | Ranken et al. | Apr. 13, 1954 |
| 2,801,198 | Morris et al. | July 30, 1957 |
| 2,879,827 | Bowditch | Mar. 31, 1959 |
| 2,888,418 | Albanese | May 26, 1959 |